(12) United States Patent
Appukutty et al.

(10) Patent No.: US 9,994,150 B2
(45) Date of Patent: *Jun. 12, 2018

(54) CHILD SEAT MONITORING SYSTEM AND METHOD

(71) Applicant: Ford Global Technologies, LLC, Dearborn, MI (US)

(72) Inventors: Jayagopal Appukutty, Troy, MI (US); Mahmoud Yousef Ghannam, Canton, MI (US); Dana Conner, Southfield, MI (US); Clara Bennie, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/589,678

(22) Filed: May 8, 2017

(65) Prior Publication Data

US 2017/0240111 A1     Aug. 24, 2017

Related U.S. Application Data

(63) Continuation of application No. 14/936,261, filed on Nov. 9, 2015, now Pat. No. 9,663,032.

(51) Int. Cl.
*B60Q 1/00* (2006.01)
*B60Q 9/00* (2006.01)
(Continued)

(52) U.S. Cl.
CPC ............. *B60Q 9/00* (2013.01); *B60K 35/00* (2013.01); *B60N 2/002* (2013.01); *B60N 2/26* (2013.01);
(Continued)

(58) Field of Classification Search
CPC .................................. B60N 2/00; B60R 1/00
See application file for complete search history.

(56) References Cited

U.S. PATENT DOCUMENTS 6,924,742 B2    8/2005   Mesina
6,998,988 B1    2/2006   Kalce
(Continued)

FOREIGN PATENT DOCUMENTS

FR        2310139 A1    12/1976
JP      2000168500 A     6/2000

OTHER PUBLICATIONS

Jonathan Machado, ANEIROS Child Car Seat Safety System, Indiegogo, https://www.indiegogo.com/projects/aneiros-child-car-seat-safety-system#/story.
(Continued)

*Primary Examiner* — Shirley Lu
(74) *Attorney, Agent, or Firm* — James P. Muraff; Neal, Gerber & Eisenberg LLP

(57) ABSTRACT

Embodiments include a vehicle comprising a user interface, a first sensor coupled to a child seat for detecting a child seat belt status; a gear selector for selecting a vehicle gear, and a processor communicatively coupled to the first sensor and the gear selector, and configured to cause the user interface to present a first notification if a first alarm condition is detected based on the child seat belt status and a selected gear. Embodiments also include a method of providing child seat monitoring in a vehicle, the method comprising receiving a gear position from a vehicle gear selector, receiving a child seat belt status from a first sensor coupled to a vehicle child seat, and presenting a first notification using a vehicle user interface if the gear position is a non-park position and the child seat belt status is unbuckled.

29 Claims, 8 Drawing Sheets

(51) Int. Cl.
  *B60N 2/00* (2006.01)
  *B60Q 5/00* (2006.01)
  *B60K 35/00* (2006.01)
  *B60N 2/26* (2006.01)

(52) U.S. Cl.
  CPC ........ *B60Q 5/005* (2013.01); *B60K 2350/106* (2013.01); *B60K 2350/1076* (2013.01)

(56) References Cited

U.S. PATENT DOCUMENTS

| | | | |
|---|---|---|---|
| 7,170,401 B1 | 1/2007 | Cole | |
| 7,378,979 B2 | 5/2008 | Rams, Jr. | |
| 7,786,852 B2 | 8/2010 | Kautz | |
| 8,179,274 B2 | 5/2012 | Rork et al. | |
| 2002/0063009 A1* | 5/2002 | Oyaski | B60K 28/063 180/286 |
| 2003/0102688 A1* | 6/2003 | Bingle | E05B 83/26 296/76 |
| 2008/0055064 A1 | 3/2008 | Keith et al. | |
| 2009/0082926 A1 | 3/2009 | Klein | |
| 2010/0302022 A1* | 12/2010 | Saban | B60N 2/002 340/459 |
| 2014/0284975 A1* | 9/2014 | Manimbo | B60N 2/002 297/217.4 |
| 2014/0292503 A1* | 10/2014 | Schoenberg | B60R 21/01556 340/438 |
| 2016/0121848 A1* | 5/2016 | Seibert | B60N 2/002 340/457 |
| 2016/0200250 A1 | 7/2016 | Westmoreland | |
| 2016/0339838 A1* | 11/2016 | Diaz | B60Q 9/00 |

OTHER PUBLICATIONS

Search Report dated May 11, 2017 for GB Patent Application No. GB1618770.0 (3 pages).

* cited by examiner

CHILD SEAT MONITORING SYSTEM AND METHOD

CROSS-REFERENCE TO RELATED APPLICATION

This application is a continuation of U.S. patent application Ser. No. 14/936,261, filed on Nov. 9, 2015, which is hereby incorporated by reference in its entirety.

TECHNICAL FIELD

This application generally relates to child seats in a vehicle, and more specifically, to monitoring the status of a child seat installed in a vehicle.

BACKGROUND

Many vehicles include a front seat belt monitoring system that outputs a warning or alert signal (e.g., an audible alarm or beep) if the driver-side seatbelt and/or the front passenger-side seatbelt is unbuckled. Some vehicles also include a rear seatbelt monitoring system that outputs a warning if one of the rear seatbelts is unbuckled. Both types of monitoring systems typically include a presence detection component that determines whether a person is sitting in the seat before checking a seat belt status. In some vehicles, in addition to, or instead of, the audible alarm, a warning icon or image of an unbuckled seatbelt is displayed on a display screen of the instrument panel or dashboard of the vehicle. Also in some vehicles, an unbuckled rear seatbelt warning may differ from an unbuckled front seat belt warning, so that the driver can easily differentiate between the two types of warnings and quickly identify the seat with an unbuckled seatbelt.

Some vehicles also include a child seat monitoring system that outputs one or more warnings depending on a child seat status. For example, one type of child seat monitoring system detects whether the child seat is installed in the vehicle according to pre-existing installation guidelines, monitors a seatbelt buckle status and other conditions of the child seat, and outputs child seat status information via a user interface or display screen of the system. Another type of child seat monitoring system detects the presence of an unattended child within the vehicle and outputs an audible warning and/or other notification designed to alert the driver, or other nearby person(s), to the situation.

However, existing systems are not capable of monitoring a status of the child seat, child seat belt, and/or child seat belt buckle when the vehicle ignition is "on" and the vehicle gear is in "drive," and continuing to monitor the status of the child seat belt buckle when the vehicle gear is in "park" and/or the vehicle ignition is "off." For example, existing child seat monitoring systems are not able to notify the driver if the child seat belt becomes unbuckled while driving and also notify the driver if a child remains buckled in the child seat after the driver has parked and/or exited the vehicle. Accordingly, there is still a need in the art for vehicle systems and methods that can provide comprehensive child seat monitoring.

SUMMARY

The invention is intended to solve the above-noted and other problems by providing comprehensive vehicle child seat monitoring systems and methods that can (1) monitor the status of a child seat belt buckle and output one or more warnings if the seat belt is unbuckled while the vehicle gear is in "drive" or other non-park position, and (2) monitor the status of the child seat belt buckle and output one or more warnings if the seat belt remains buckled while the ignition is "off."

For example, one embodiment provides a vehicle comprising a user interface, a first sensor coupled to a child seat for detecting a child seat belt status, a gear selector for selecting a vehicle gear, and a processor communicatively coupled to the first sensor and the gear selector, and configured to cause the user interface to present a first notification if a first alarm condition is detected based on the child seat belt status and a selected gear.

Another example embodiment provides a method of providing child seat monitoring in a vehicle, the method comprising receiving a gear position from a vehicle gear selector, receiving a child seat belt status from a first sensor coupled to a vehicle child seat, and presenting a first notification using a vehicle user interface if the gear position is a non-park position and the child seat belt status is unbuckled.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
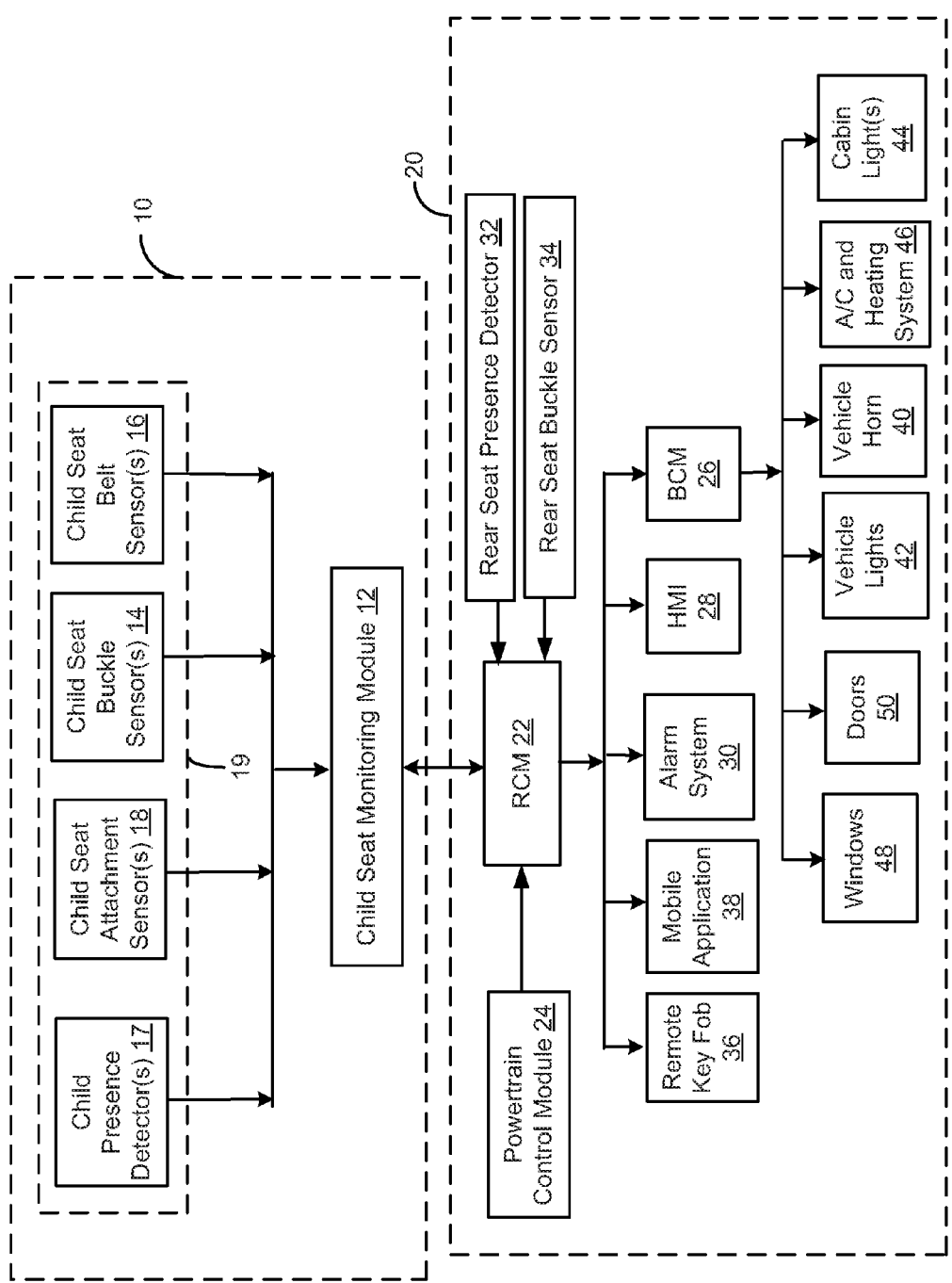
FIG. 1 is a block diagram of an exemplary child seat monitoring system coupled to an example vehicle system in accordance with certain embodiments.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

FIG. 1 illustrates an exemplary child seat monitoring system 10 configured to monitor one of more aspects of a vehicle child seat and a vehicle in which the child seat is installed, and upon detecting an alarm condition, cause the vehicle to output one or more notifications for alerting a vehicle driver, or other person(s) near the vehicle, to the alarm condition, in accordance with embodiments. As shown, the child seat monitoring system 10 includes a child seat monitoring module 12 and one or more child seat buckle sensor(s) 14. In some embodiments, the child seat monitoring system 10 can also include one or more child seat attachment sensor(s) 16, child presence detector(s) 17, and/or child seat belt sensor(s) 18. Each of the child seat buckle sensor(s) 14, the child seat belt sensor(s) 16, the child presence detector(s) 17, and the child seat attachment sensor(s) 18 (collectively referred to herein as "child seat sensors 19") can be communicatively coupled to the child seat monitoring module 12 in order to provide sensor or status information (e.g., in the form of input signals) to the module 12. The child seat monitoring module 12 is also communicatively coupled to a vehicle system 20 comprising various components included in, or associated with, a vehicle (not shown). The child seat monitoring module 12 receives vehicle information from, and provides command signals to, the vehicle system 20. For example, in embodiments, the child seat monitoring module 12 is configured for, or capable of, receiving vehicle information from the vehicle system 20; receiving sensor information from one or more of the child seat sensors 19; based on the received information, determining whether an alarm condition exists; and if an alarm condition exists, causing the vehicle system 20 to output one or more notifications to alert a driver or other person(s) near the vehicle to the alarm condition.

Figure 4:
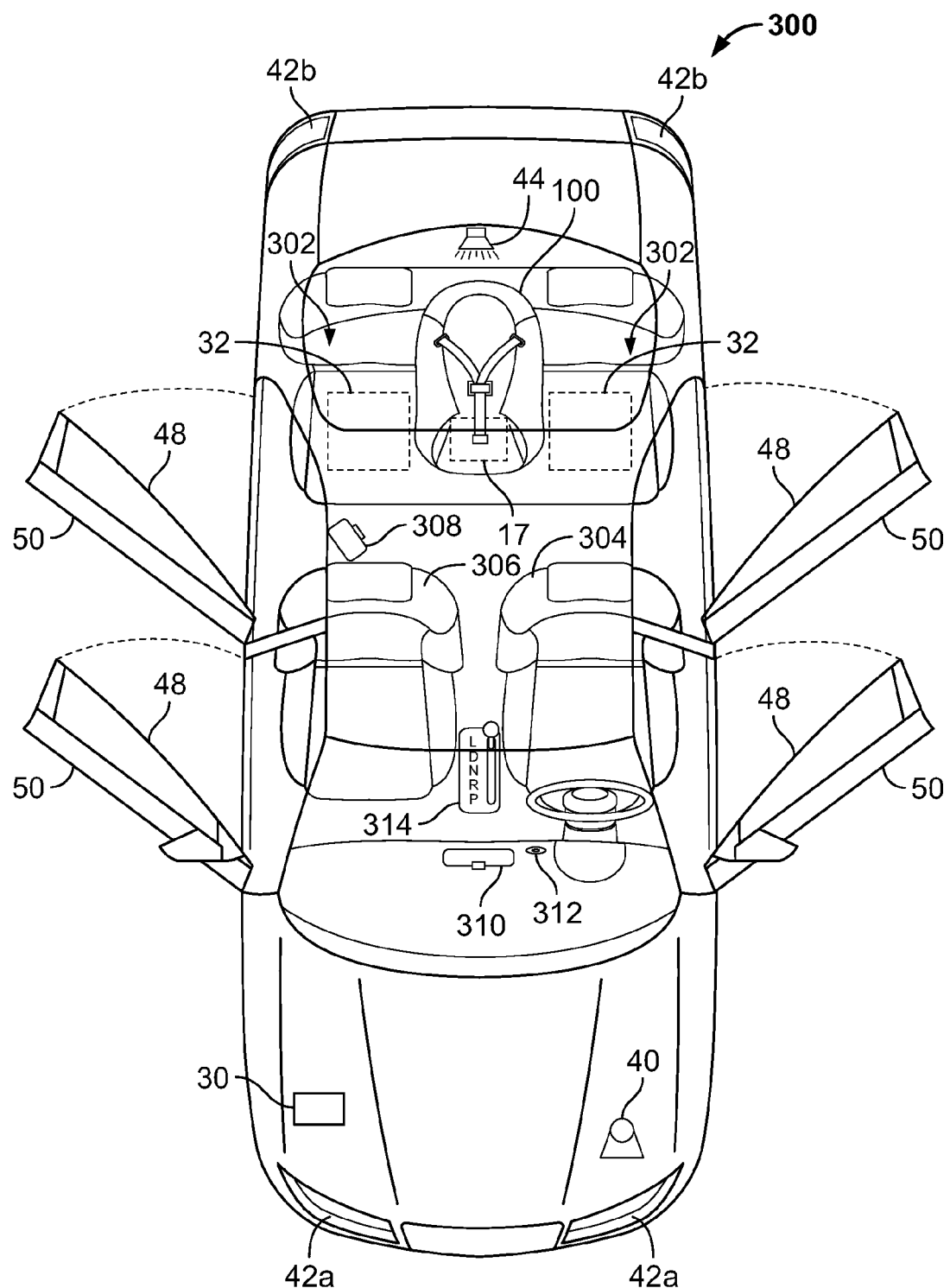
FIG. 4 is an illustration of an exemplary vehicle associated with the vehicle system shown in FIG. 1, in accordance with certain embodiments.
Figure 5:
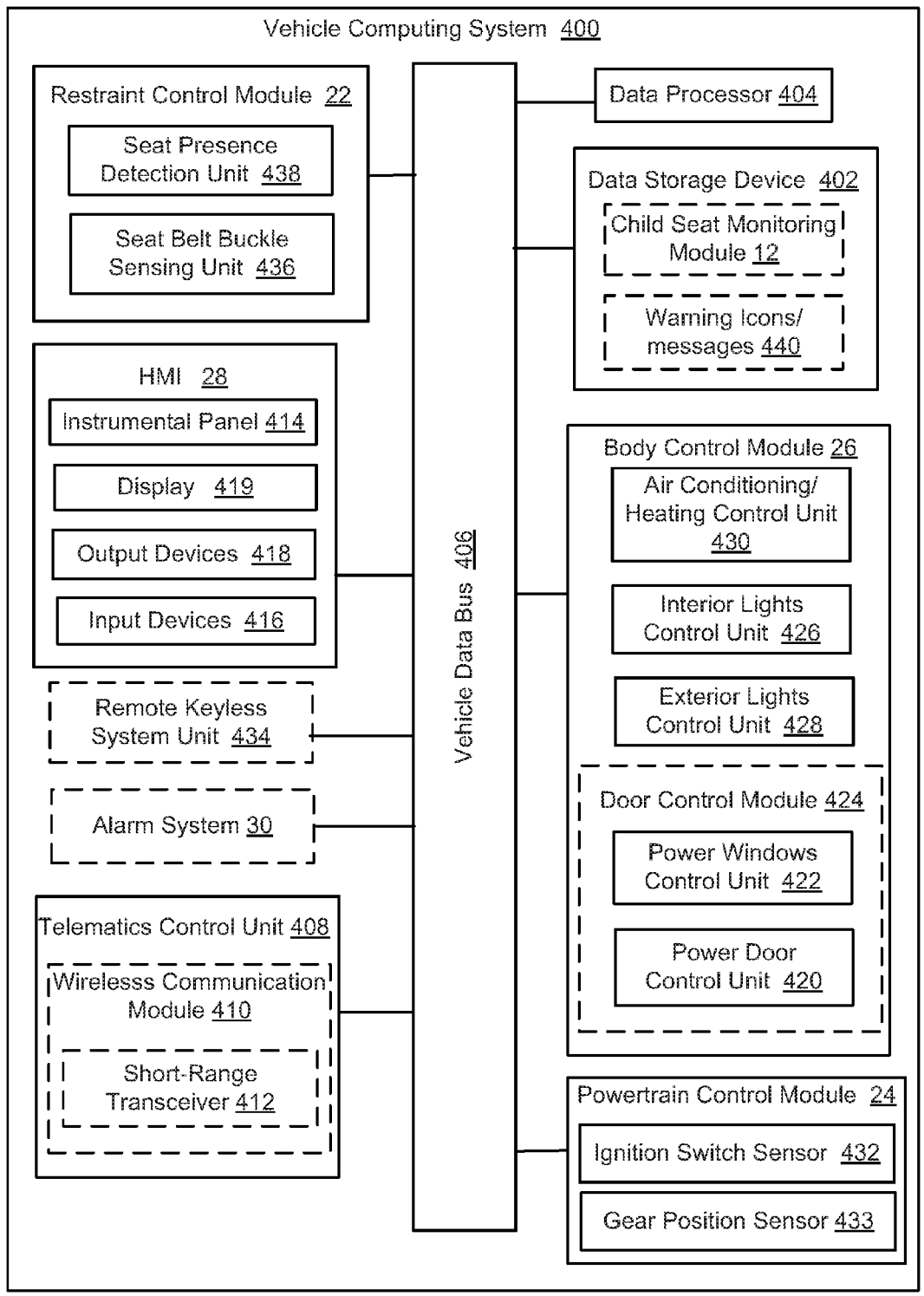
FIG. 5 is a block diagram showing an exemplary vehicle computing system of the vehicle shown in FIG. 4, in accordance with certain embodiments.
Figure 6A:
FIGS. 6A-D are illustrations of exemplary notification icons for display on a display screen of the vehicle shown in FIG. 1, in accordance with certain embodiments.
Figure 6B:
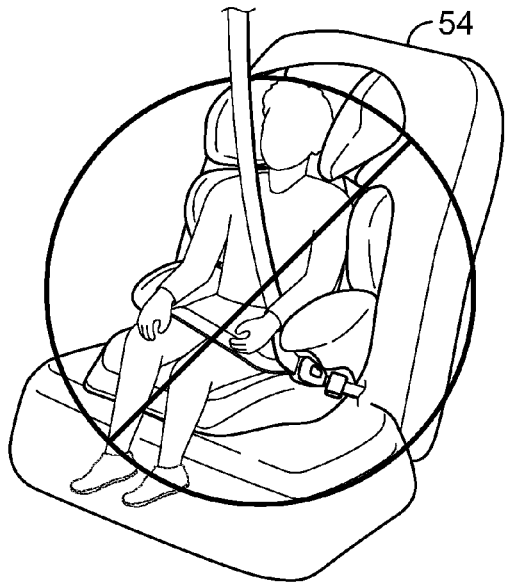
Figure 6C:
Figure 6D:
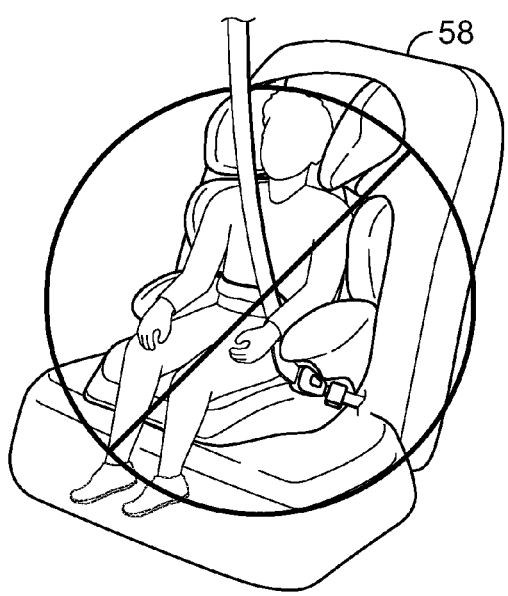

Various components of the child seat monitoring system 10 can be included in the child seat (such as, e.g., such child seat 100 shown in FIG. 2 or child seat 200 shown in FIG. 3), in the vehicle (such as, e.g., vehicle 300 shown in FIG. 4), or in the vehicle computing system of the vehicle (such as, e.g., vehicle computing system (VCS) 400 shown in FIG. 5). For example, in embodiments, one or more of the child seat buckle sensor(s) 14, the child seat belt sensor(s) 16, the child presence detector 17, and the child seat attachment sensor(s) 18 can be integrated into, or attached to, the car seat 100 and/or 200. As another example, the child seat monitoring module 12 comprises program modules or software instructions that can be stored in a data storage device 402 and executed by a data processor 404 of the vehicle computing system 400, as described in more detail below.

Various components of the vehicle system 20 may be integrated into the vehicle 300, associated with the vehicle 300, and/or included in the vehicle computing system 400. For example, as shown in FIG. 1, the vehicle system 20 includes a restraint control module (RCM) 22, a powertrain control module 24, a body control module 26, and a human-machine interface (HMI) 28, all of which can be included in the VCS 400, as shown in FIG. 5 and described in more detail below. As another example, the vehicle system 20 also includes an alarm system 30, a rear seat presence detector 32, and a rear seat buckle sensor 34, all of which can be included in the vehicle 300 as described in more detail below. As a further example, in some cases, the vehicle system 20 includes a key fob 36 and a mobile application 38, both of which may be associated with, or wirelessly linked to or paired with, the vehicle 300 to provide remote access to one or more functions of the vehicle 300, as will be appreciated.

According to embodiments, the notifications provided through the vehicle system 20 to alert the driver or other person(s) to an alarm condition can be selected from one or more of the following categories: (i) a graphical warning (e.g., a textual message and/or pictorial icon, such as, e.g., icons 52, 54, 56, and 58 shown in FIGS. 6A-6D) displayed on a display included in the human-machine interface 28, another portion of the vehicle 300, or a mobile device running the mobile application 38; (ii) an audible alarm (e.g., a chime, horn sound, buzzer sound, voice command, etc.) transmitted through an audio speaker or other sound-making device included in the HMI 28, the alarm system 30, a vehicle horn 40, another portion of the vehicle 300, or the key fob 36; (iii) a light-based alert (e.g., a flashing or blinking light, turning on a light, etc.) provided by vehicle lights 42 included on an exterior body of the vehicle 300 (e.g., headlights, taillights, parking lights, etc.), cabin lights 44 included in an interior space of the vehicle 300, or lights (e.g., light-emitting diodes (LEDs)) included in the key fob 36, the HMI 28, or another portion of the vehicle 300; and (iv) an automatic system override (e.g., disabling or enabling a system, turning a system on or off, etc.) applied to a vehicle air-conditioning (A/C) and heating system 46, vehicle windows 48, vehicle doors 50 (including, for example, door locks), or other vehicle system or device.

The child seat monitoring module 12 can be configured to select one or more of the notification categories and a predetermined source for each selected notification category based on the type of alarm condition detected by the child seat monitoring module 12. In embodiments, an alarm condition detected during a driving event (e.g., when a vehicle ignition is "on" and vehicle gear is not in "park") can trigger a first set of notifications, and an alarm condition detected during a non-driving event (e.g., when the vehicle ignition is "off") can trigger a second set of notifications. The first set of notifications can include, for example, one or more of a graphical warning, an audible alarm, and a light-based alert that is presented through the HMI 28, and can be repeated if the alarm condition is not removed within a predetermined time period. In one embodiment, the first set of notifications includes presentation of a select one of the icons 52-58 on a display screen of the HMI 28, the exact icon depending on the type of alarm condition, as described in more detail below. In some embodiments, the first set of notifications can be continuously presented until the alarm condition is removed. In some embodiments, the first set of notifications includes two or more notifications that are simultaneously presented through the HMI 28 (e.g., a graphical warning displayed on the display screen of the HMI 28 and an audible alarm transmitted through an audio device of the HMI 28).

The second set of notifications can include a series of notifications with an escalating level of intensity or obtrusiveness between an initial notification and each subsequent notification, for example, in order to convey a growing sense of urgency as time passes and/or to ensure that a vehicle operator or other person(s) near the vehicle 300 are effectively notified of the alarm condition in a timely manner. According to embodiments, the second set of notifications can include one or more initial notifications and one or more subsequent notifications. In some embodiments, two or more subsequent notifications are presented in conjunction or substantially at the same time (e.g., simultaneously). In other embodiments, two or more subsequent notifications are presented sequentially, for example, if the alarm condition continues to exist after a predetermined amount of time following presentation of the immediately-preceding notification. In embodiments, the subsequent notification(s) can be continuously presented until the alarm condition is removed.

In exemplary embodiments, the initial notification can be presented in an interior of the vehicle 300 and can be similar to the notification(s) presented during a driving event (e.g., a graphical warning, an audible alarm, and/or a light-based alert presented through the HMI 28). The subsequent notification(s) can be presented in an interior and/or exterior of the vehicle 300 and can include, for example, one or more of (i) a light-based alert presented through the cabin lights 44 (e.g., turning on the cabin lights 44 if an outer environment of the vehicle 300 is dark), the exterior vehicle lights 42 (e.g., turning on or flashing the headlights, taillights or other vehicle lights 42), and/or the key fob 36 (e.g., blinking on and off a light on the key fob 36); (ii) an audible alarm presented through the vehicle horn 40 and/or the alarm system 30; (iii) a graphical warning presented on a mobile device of the vehicle operator using the mobile application 38; and (iv) an automatic system override of the vehicle A/C and heating system 46 (e.g., turning on the A/C system if the outside temperature is above a first predetermined threshold and/or turning on the heating system if the outside temperature is below a second predetermined threshold), the vehicle windows 48 (e.g., automatically opening the windows 48 a predetermined amount and disabling further control of the windows 48 until the alarm condition is removed), and/or the vehicle doors 50 (e.g., automatically unlocking the doors 50 and disabling further control of the doors 50 until the alarm condition is removed).

In embodiments, the child seat monitoring module 12 can be configured to detect a plurality of different alarm conditions depending on the output signal(s) received from the child seat buckle sensor(s) 14 and/or the other child seat sensors 19. For example, a first alarm condition can be triggered upon receiving one or more output signals from the vehicle system 20 indicating that the vehicle ignition is "on" (e.g., based on an output of the powertrain control module 24), the vehicle gear is not in "park" (e.g., based on an output of the powertrain control module 24), and the child seat 100 has an unbuckled status (e.g., based on an output of the child seat buckle sensor(s) 14). In embodiments, the first set of notifications can be presented upon detecting the first alarm condition. As another example, a second alarm condition can be triggered upon receiving one or more output signals from the vehicle 20 indicating that the vehicle ignition is "off" and the child seat 100 has a buckled status. In embodiments, the second set of notifications can be presented upon detecting the second alarm condition.

The components of the child seat monitoring system 10 and the vehicle system 20 of FIG. 1 will now be described in more detail with reference to FIGS. 2-5 and 7.

Figure 2:
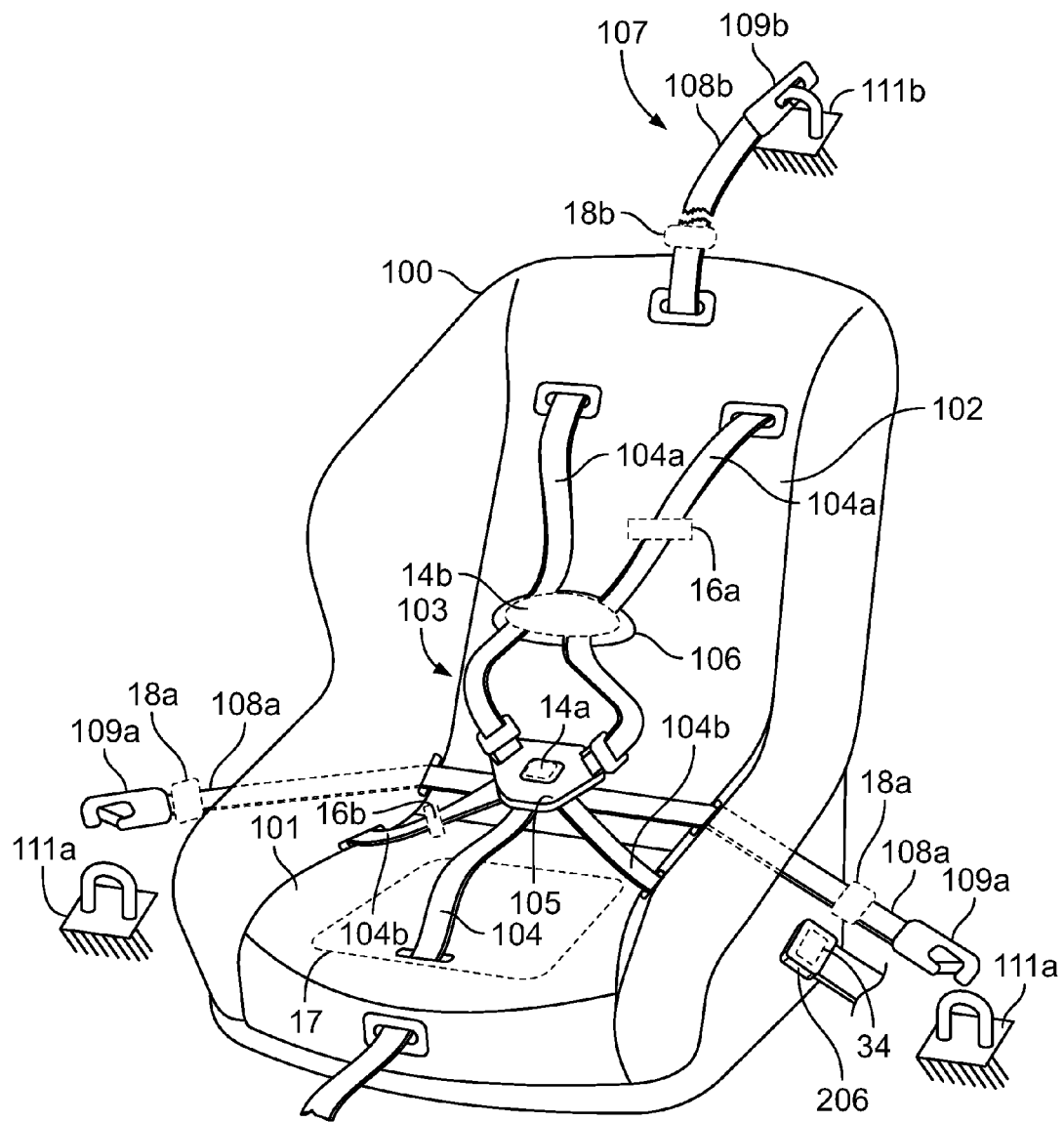
FIG. 2 is an illustration of an exemplary child seat comprising one or more components of the child seat monitoring system of FIG. 1 in accordance with certain embodiments.

Referring initially to FIG. 2, shown is the child seat 100 in accordance with embodiments. The child seat 100 includes a seat bottom 101, which provides a generally flat surface for a child to sit upon, a seat back 102 coupled to the seat bottom 101 for the child to rest his/her back upon, and a restraint system 103 coupled to the seat bottom 101 and the seat back 102 for securing the child to the child seat 100. The restraint system 103 includes a harness 104 (such as a five-point harness) comprising a plurality of straps that pass through slotted apertures in an internal frame (not shown) of the child seat 100 and exit from various locations on the seat back 102 and the seat bottom 101 (e.g., above each shoulder location in the seat back 102, on either side of a lap location in the seat bottom 101, and at a front central location of the seat bottom 101). A first buckle 105 (or "lap buckle") provides a common point for connecting together, or securing, the straps of the harness 104 over a lap of the child. A second buckle 106 (or "chest buckle") laterally connects together, or secures, a pair of upper straps of the harness 104 over a chest of the child. The harness 104 can be tightened or cinched to reduce any laxness or slack in the straps, so that the child is securely positioned within the child seat 100 and the buckles 105 and 106 are properly positioned on the lap and chest, respectively, of the child.

The child seat 100 also includes an anchor system 107 comprising a plurality of tethers 108 (or straps) for securely mounting the child seat 100 to a vehicle, such as the vehicle 300. A first tether 108*a* can extend across a lower portion of the seat back 102, and each end of the first tether 108*a* can exit from an opposing lateral edge of the seat back 102, as shown. In other embodiments, the first tether 108*a* may extend through the internal frame of the child seat 100 or across a back side (not shown) of the seat back 102. A second tether 108*b* can have a first end (not shown) coupled to the internal frame of the child seat 100 and an opposing, second end that exits from a top of the seat back 102, as shown. The tethers 108 can be tightened or cinched to securely mount the child seat 100 to the vehicle.

The anchor system 107 also includes a plurality of anchor connectors 109 that are coupled to each end of the first tether 108*a* and the second end of the second tether 108*b*, respectively. Each anchor connector 109 includes a latch or hook that can be secured to one of a plurality of vehicle anchors 111, which are rigidly mounted to a structure of the vehicle at various locations of the vehicle. As shown, anchor connectors 109*a* can couple the two ends of the first tether 108*a* to vehicle anchors 111*a*, which can extend upwards through a rear seat (not shown) of the vehicle. Anchor connector 109*b* can couple the second end of the second tether 108*b* to vehicle anchor 109*b*, which can be positioned in a plurality of vehicle locations depending on the type of vehicle and the direction in which the child seat 100 is facing upon installation (e.g., rear-facing or forward-facing), as will be appreciated. For example, in a van or other vehicle with more than one row of seats, the vehicle anchor 111*b* may be positioned on a floor of the vehicle behind the row of seats that the child seat 100 is mounted to. As another example, in a sedan or other vehicle with a single row of seats, the vehicle anchor 111*b* may be positioned on a rear shelf of the vehicle behind the row of seats that the child seat 100 is mounted to.

In accordance with embodiments, the child seat 100 can include, or be coupled to, various components of the child seat monitoring system 10 in order to monitor a status of the restraint system 103 and/or the anchor system 107 of the child seat 100. For example, the child seat 100 can include the child seat buckle sensor(s) 14 and the child seat belt sensor(s) 16 to monitor a status of the restraint system 103. Further, the child seat 100 can include the child seat attachment sensor(s) 17 to monitor a status of the anchor system 107.

In embodiments, the child seat buckle sensor(s) 14 can be positioned at or within one or more of the buckles included in the child seat 100 and can be configured to transmit an output signal indicative of a buckle status of the child seat 100. For example, as shown in FIG. 2, a first child seat buckle sensor 14a can be integrated into, or attached to, the lap buckle 105 of the child seat 100 in order to detect whether the lap buckle 105 has been securely fastened or buckled, and a second child seat buckle sensor 14b can be integrated into, or attached to, the chest buckle 106 in order to detect whether the chest buckle 106 has been securely fastened or buckled. In embodiments, the output signal transmitted by the child seat buckle sensor(s) 14 can include, for example, a high value if one of the buckles 105, 106 is unbuckled and a low value if both of the buckles 105 and 106 are securely buckled, or vice versa. The child seat buckle sensor(s) 14 can include any type of sensor capable of determining whether the buckle 105, 106 is properly buckled or latched, including, for example, an electrical or mechanical switch, a proximity sensor, an infrared sensor, a magnetic, fluidics sensor, an occupant presence mat, and a camera.

Also in embodiments, the child seat belt sensor(s) 16 can be positioned at various locations along the harness 104 in order to determine whether the harness 104 is sufficiently taut and/or properly positioned over the child and transmit an output signal indicative of a belt status of the child seat 100. For example, as shown in FIG. 2, a first child seat belt sensor (or "chest belt sensor") 16a can be attached to one of two upper straps 104a included in the harness 104 and positioned adjacent to a chest of a child seated in the child seat 100. In other embodiments, each of the upper straps 104a can include the chest belt sensor 16a in order to measure the tension in both of the upper straps 104a. As also shown in FIG. 2, a second child seat belt sensor (or "lap belt sensor") 16b can be attached to one of two lower straps 104b included in the harness 104 and positioned adjacent to a lap of the child seated in the child seat 100. In other embodiments, each of the lower straps 104b can include the lap belt sensor 16b in order to measure the tension in both of the lower straps 104b. In embodiments, the child seat belt sensors 16 can be positioned on an exterior of the child seat 100 and/or internally, for example, within the straps of the harness 104 or within the seat bottom 101 and/or the seat back 102. Further, the exact position of the child seat belt sensors 16 in the child seat 10 can vary depending on the type of sensing technology used and the type and/or size of the child seat 100.

In some cases, the chest belt sensor 16a is a force sensor configured to measure an amount of force or tension in the upper strap 104a and the lap belt sensor 16b is a force sensor configured to measure an amount of force or tension in the lower strap 104b. In such cases, each of the sensors 16a and 16b can transmit an output signal indicative of the measured tension to the child seat monitoring module 12, and the module 12 can be configured to compare the measured tension to a predetermined threshold value to determine whether the harness 104 is sufficiently taut. Additional alternative embodiments of the child seat belt sensor(s) 16 include a torque sensor for measuring a torque value of the harness 104 about one or more of the buckles 105 and 106, a pressure sensor for measuring an amount of pressure exerted on one or more straps of the harness 104, or any other device that is capable of sensing insufficient tightness in the harness 104.

In embodiments, the child seat 100 can also include the child seat attachment sensors 18 positioned at various locations of the anchor system 107 in order to determine whether the anchor system 107 is tautly secured to and/or properly installed in the vehicle 300 and to transmit an output signal indicative of an attachment status of the child seat 100. The exact position of the child seat attachment sensors 18 in the anchor system 107 can vary depending on the type of sensing technology used, the type and/or size of the child seat 100, and the component being sensed (e.g., the tethers 108 or the anchor connectors 109).

For example, in some embodiments, the child seat attachment sensors 18 can be tether sensors for detecting a tightness of the tethers 108. As shown in FIG. 2, in such cases, the attachment sensors 18 can include two lower child seat attachment sensors 18a attached to, or positioned at, either end of the first tether 108a adjacent to each of the anchor connectors 109a in order to detect whether the first tether 108a is tightly secured to the rear seat of the vehicle 300. As also shown in FIG. 2, an upper child seat attachment sensor 18b can be attached to, or positioned at, a second end of the second tether 108b adjacent to the anchor connector 109b to detect whether the second tether 108b is tightly secured to the vehicle 300. In such embodiments, each of the child seat attachment sensors 18a and 18b can include a force sensor configured to measure an amount of force or tension in the tethers 108a and 108b, respectively, and transmit an output signal indicative of the measured tension to the child seat monitoring module 12. The module 12 can be configured to compare the measured tension in each tether 108a, 108b to a predetermined threshold value to determine whether the tethers 108 are sufficiently taut.

In other embodiments, the child seat attachment sensors 18 can be anchor sensors for detecting a proper attachment of the child seat 100 to the anchors 111. In such cases, the attachment sensors 18 can be positioned on, or included within, one or more of the vehicle anchors 111 and/or the anchor connectors 109 to determine whether the anchor connectors 109 are securely latched to each of the vehicle anchors 111. Each of the child seat attachment sensors 18a and 18b can include a proximity sensor, infrared sensor, contact sensor, pressure sensor, or other type of sensor capable of detecting a latching status of the anchor connectors 109a and 109b relative to the vehicle anchors 111a and 111b, respectively, and transmitting an output signal indicative of the latching status to the child seat monitoring module 12. As an example, the output signal may have a high value if all of the anchor connectors 109 are properly latched to the respective anchors 111 and a low value if one or more of the anchor connectors 109 is not properly latched, or vice versa.

In embodiments, the child seat 100 can also include, or have coupled thereto, the child presence detector 17 for detecting the presence of a child within the child seat 100 and transmitting an output signal indicating said presence. The child presence detector 17 can include use any suitable type of presence-detecting technology, and the exact position of the child presence detector 17 within the child seat 100 can vary depending on the type of sensing technology and/or the type or size of the child seat 100.

For example, as shown in FIG. 2, the child presence detector 17 can be included in, or coupled to, the seat bottom 101 of the child seat 100. In such cases, the child presence detector 17 can be a weight sensor for measuring a weight placed on the seat bottom 101 and transmitting an output signal indicative of the weight of the child seated in the child seat 100. Alternatively, the child presence detector 17 can be a pressure sensor that is triggered once a weight or pressure on the seat bottom 101 exceeds a predetermined threshold and when triggered, transmits an output signal indicating that a child has been detected in the car seat 100.

In other cases, the child presence detector 17 can be a proximity or infrared sensor that is positioned on one or more surfaces of the car seat 100 and is capable of detecting an object placed in a detection path of the sensor. For example, an infrared sensor may be positioned in opposing sides of the child seat 100. As another example, a proximity sensor may be positioned in the seat bottom 101 and/or the seat back 102.

As will be appreciated, the car seat 100 shown in FIG. 2 can be any type of child seat that includes a harness (or the restraint system 103) and a tether (or the anchor system 107), including, for example, a "convertible" car seat (e.g., a child seat that can be changed from a rear-facing position to a forward-facing position), an "all-in-one" car seat (e.g., a child seat that can change from a rear-facing seat to a forward-facing seat and then to a booster seat), and a "combination" car seat (e.g., a child seat that can transition from a forward-facing seat to a booster seat). In embodiments, the child seat monitoring system 10 can be adapted for a child seat that does not include a harness and/or a tether, such as, for example, a backless booster seat or a high back booster seat.

Figure 3:
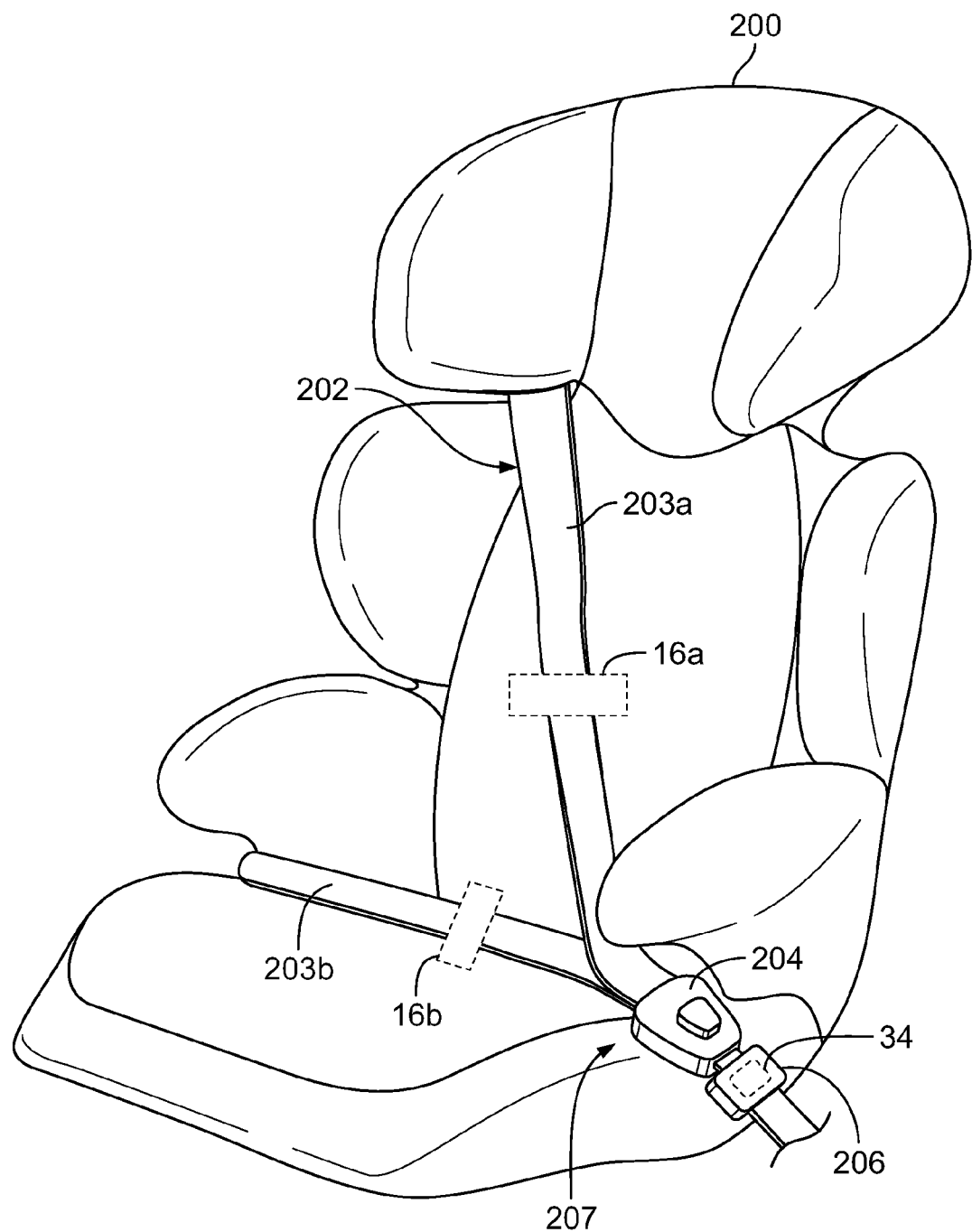
FIG. 3 is an illustration of another exemplary child seat comprising one or more components of the child seat monitoring system of FIG. 1 in accordance with certain embodiments.

For example, referring additionally to FIG. 3, shown is an exemplary child seat 200 (e.g., a high back booster seat) without a harness or tether system. A child seated in the child seat 200 can be secured to the child seat 200 using a rear seat belt system 202, such as, for example, the seat belt system for a rear seat 302 of the vehicle 300. As will be appreciated, the rear seat belt system 202 includes a seat belt 203 (also referred to as "webbing"), a tongue portion 204, and a buckle portion 206. The seat belt 203 has two fixed ends (not shown) that are coupled to the vehicle 300 and a free end 207 that is attached to the tongue portion 204. The tongue portion 204 is configured for insertion into, or attachment to, the buckle portion 206.

As shown in FIG. 3, the buckle portion 206 can include the rear seat belt sensor 34 for detecting whether the tongue portion 204 is coupled to the buckle portion 206 and transmitting an output signal indicative of a buckle status of the rear seat belt system 202. For example, the output signal may be a high value if the rear seat belt system 202 is properly buckled and a low value if the rear seat belt system 202 is unbuckled, or vice versa. In embodiments, the output signal can be provided to the restraint control module (RCM) 22 of the vehicle system 20 and/or the vehicle computing system 400, and the RCM 22 can provide the output signal to the child seat monitoring module 12.

As also shown in FIG. 3, in some embodiments, the child seat belt sensor(s) 16 can be coupled to the rear seat belt system 202 for determining whether the seat belt 203 is properly positioned on the child in the child seat 200 and/or is sufficiently taut (e.g., by measuring a force or tension in the seat belt 203). For example, the chest belt sensor 16a can be positioned on or attached to an upper or chest belt portion 203a of the seat belt 203 to detect a tautness of the chest belt portion 203a over a chest of the child. Also, the lap belt sensor 16b can be positioned on or attached to a lower or lap belt portion 203b of the seat belt 203 to detect a tautness of the lap belt portion 203b across a lap of the child. As described above, the output signal(s) of the child seat belt sensor(s) 16 can be provided to the child seat monitoring module 12. In one embodiment, instead of adding the child seat belt sensor(s) 16 to the rear seat belt system 202, the vehicle system 20 may include similar seat belt sensor(s) (not shown) as part of the rear seat belt system 200. For example, a pressure sensor or force sensor may be included at one or more locations of the seat belt 203 for measuring an amount of pressure or force, respectively, that is placed on the seat belt 203.

Referring now to FIG. 4, shown is the exemplary vehicle 300 configured to operate with, or include, the child seat monitoring system 10, in accordance with embodiments. In addition to the rear seat 302, the vehicle system 300 includes a driver seat 304 and a front passenger seat 306. As shown, the rear seat 302 includes one or more rear seat presence detectors 32 for detecting the presence of a vehicle occupant and/or the child seat (e.g., the child seat 100 or 200) in each seat of the rear seat 302. The rear seat presence detector 32 can include any suitable presence detection device, such as, for example, a pressure sensor, weight sensor, proximity sensor, or infrared sensor. In some embodiments, the rear seat presence detector 32 can be part of a vehicle occupant classification system (OCS) (not shown) for detecting the presence of, and distinguishing between, vehicle occupants and child seats in each of the seats 302, 304, and 306 of the vehicle 300, as described in more detail below.

As shown in FIG. 4, the child seat 100 can include the child presence detector 17 in the seat bottom 101 of the child seat 100 to determine whether a child is occupying the child seat 100. In some cases, the child presence detector 17 operates independently of the rear seat presence detector 32, such that the rear seat presence detector 32 is configured to detect the presence of the car seat or other vehicle occupant in the rear seat 302 and the child presence detector 17 is used to detect the presence of the child in the child seat 100. In other cases, the child presence detector 17 may not be included in the child seat 100 and instead, the rear seat presence detector 32, and/or vehicle OCS, can be used to detect the presence of a child in the child seat 100.

In some embodiments, the vehicle 300 further includes an in-vehicle camera 308 for obtaining status information for the child seat 100. The camera 308 can be positioned to face the rear sear 302, as shown in FIG. 4, and can include any suitable type of camera, including, for example, a dash camera, a rear view camera, an infrared camera, a monochrome CCD camera, a color CCD camera, or a Kinect camera. Images captured by the camera 308 can be transmitted to one or more components of the child seat monitoring system 10 and/or the vehicle system 20 to process the images and extract status information therefrom.

For example, in some cases, the camera 308 can be used to obtain status information for the child presence detector 17 and/or the rear seat presence detector 32 by capturing images of the child seat 100 (or the child seat 200) and the rear seat 302. The child presence detector 17 and/or the rear seat presence detector 32 can use the captured images to determine whether a child is occupying the child seat 100 and/or the child seat 100 is occupying the rear seat 302, for example, by comparing the captured images to pre-stored images representing an occupied state and an unoccupied state, or using other known techniques.

As another example, in some cases, the camera 308 can be used to obtain status information for the child seat belt sensor 16 and/or the rear seat belt sensor (not shown) by capturing images of the harness 104 of the child seat 100 on the child and/or the seat belt 203 of the rear seat 302 on the child. The child seat belt sensor 16 and/or the rear seat belt sensor can used the captured images to determine whether the harness 104 and/or the seat belt 203 is properly positioned on the child, for example, by comparing the capture images to pre-stored images showing proper and improper seat belt/harness placements, or using other known techniques.

As shown in FIG. 4, the vehicle 300 includes various other components of the vehicle system 20, such as the vehicle alarm system 30, the vehicle horn 40, the vehicle lights 42 included on an exterior of the vehicle and including headlights 42a and taillights 42b, the cabin light(s) 44 included in an interior or cabin area of the vehicle 300, the windows 48 which may be power-operated, and the doors 50 which may include power-operated locks and one or more power-operated doors. As illustrated, the vehicle 300 also includes a rear view mirror 310 for enabling a driver to look behind the vehicle 300, an ignition switch 312 for starting or turning off an engine (not shown) of the vehicle 300, and a gear selector 314 (also known as a "gearshift") for changing a gear of the vehicle 300 between, for example, park ("P"), reverse ("R"), neutral ("N"), drive ("D"), and low gear ("L").

Referring back to FIG. 1, the components of the child seat monitoring system 10 can communicate with each other and/or the components of the vehicle system 20 using wired or wireless connections. For example, in some cases, one or more of the child seat sensors 19 includes a transmitter (not shown) for wirelessly transmitting the output signals to the child seat monitoring module 12, the RCM 22, or other component of the child seat monitoring system 10 and/or the vehicle system 20. In other cases, one or more of the child seat sensors 19 can be coupled via a wired connection (e.g., using a fixed cable) to the child seat monitoring module 12, the RCM 22, or other component of the child seat monitoring system 10 and/or the vehicle system 20.

Figure 7:
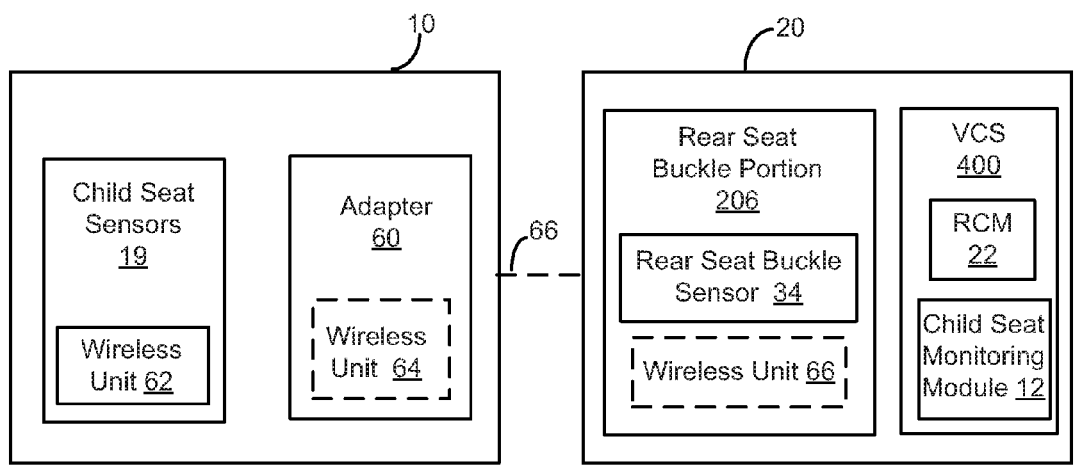
FIG. 7 is another block diagram of the exemplary child seat monitoring system and vehicle system shown in FIG. 1, in accordance with certain embodiments.

For example, referring now to FIG. 7, in embodiments where the child seat monitoring module 12 resides in and is executed by the vehicle computing system 400, the child seat monitoring system 10 can further include an adapter 60 for connecting each of the child seat sensors 19 to the vehicle system 20. The adapter 60 (also referred to as a "child seat adapter") can be coupled to, or integrated into, the child seat 100 and communicatively coupled to each of the child seat sensors 19. As shown in FIG. 7, in some embodiments, the child seat sensors 19 can include a wireless unit 62 for wireless communicating output signals to the adapter 60. In such cases, the adapter 60 can include a wireless unit 64 for receiving the output signals transmitted by the child seat sensors 19.

In some embodiments, the child seat adapter 60 can be communicatively coupled to the rear seat buckle sensor 34 of the rear seat belt system 202. For example, as shown in FIG. 7, in some cases, the adapter 60 can include a cable 66 (or cable jumper) with a connector or plug (not shown) capable of being coupled to, or inserted into, the rear seat buckle portion 206. In one embodiment, the rear seat buckle portion 206 is adapted to include a port or other connection point (not shown) for receiving the connector of the adapter 60. In another embodiment, the adapter connector is configured as a seat belt tongue for insertion into the rear seat buckle portion 206.

In other cases, the wireless unit 64 of the child seat adapter 60 can be configured to communicate with a wireless unit 66 included in the rear seat buckle portion 206, as shown in FIG. 7. In such cases, the wireless unit 64 can be configured for transmitting the output signals received from the child seat sensors 19 to the wireless unit 66. The wireless unit 66 can be configured for receiving the output signals transmitted by the wireless unit 64 and for transmitting the received signals to the child seat monitoring module 12, the vehicle computing system (VCS) 400, and/or the restraint control module (RCM) 22. According to embodiments, each of the wireless units 62, 64, and 66 can include one or more antennas, receivers, transmitters, and/or transceivers configured to enable wireless communication over a short-range wireless network, such as, for example, Bluetooth, NFC, RFID, and infrared technology, or any other wireless network available within the vehicle 300 (such as, e.g., WiFi).

Other configurations for communicatively coupling the child seat 100 and/or the child seat monitoring system 10 to the vehicle system 20 are also contemplated in accordance with the principles disclosed herein. For example, in some cases, the child seat adapter 60 can be configured to communicate directly with the VCS 400, the RCM 22, the child seat monitoring module 12, or another vehicle unit (not shown) that is adjacent to the rear seat 302 and in communication with the child seat monitoring module 12 and/or the RCM 22. In such cases, the wireless unit 66 can be included in the rear seat 302 or other portion of the vehicle 300, depending on a wireless communication range of the wireless units 64 and 66.

Referring back to FIG. 5, shown is example vehicle computing system (VCS) 400 that may be included in the vehicle 300, for example, as part of a vehicle electronics system or an infotainment system of the vehicle 300, in accordance with embodiments. The VCS 400 may be an infotainment system such as the SYNC® system manufactured by FORD MOTOR COMPANY®. Other embodiments of the VCS 400 can include different, fewer, or additional components than those described below and shown in FIG. 5.

As illustrated, the VCS 400 can include data storage device 402, data processor 404 (e.g., an electronic data processor), and a vehicle data bus 406. The VCS 400 can further include various electronic control units (ECUs) that responsible for monitoring and controlling the electrical systems or subsystems of the vehicle 300. Each ECU may include, for example, one or more inputs and outputs for gathering, receiving, and/or transmitting data, a memory for storing the data, and a processor for processing the data and/or generating new information based thereon. In the illustrated embodiment, the ECUs of the VCS 400 include restraint control module (RCM) 22, powertrain control module (PCM) 24, body control module (BCM), human-machine interface (HMI) 28, and a telematics control unit (TCU) 408. In some cases, the alarm system 30 is also included in the VCS 400 and in communication with the other ECUs. In other cases, the alarm system 30 is a stand-alone unit that is coupled to the vehicle 300 and/or the VCS 400, for example, as an after-market unit. In some embodiments, the vehicle computing system 400 further includes a timer (not shown) for monitoring a timing of each notification presented by the vehicle system 20 and for notifying the child seat monitoring module 12 if a predetermined amount of time has passed after the notification presentation.

The ECUs of the VCS 400 are interconnected by the vehicle data bus 406 (such as, e.g., a controller area network (CAN) bus), which passes data to and from the various ECUs, as well as other vehicle and/or auxiliary components (e.g., the alarm system, the rear seat presence detector 32, the rear seat buckle sensor 34, etc.) in communication with the VCS 400. Further, the data processor 404 can communicate with any one of the ECUs and the data storage device 402 via the data bus 406 in order to carry out one or more functions, including the functions associated with the child seat monitoring module 12.

The TCU 408 can be an ECU for enabling the vehicle 300 to connect to one or more wireless networks, such as, for example, WiFi, WiMax, cellular (e.g., GSM, GPRS, LTE, 3G, 4G, CDMA, etc.), Bluetooth, near-field communication (NFC), radio-frequency identification (RFID), satellite, dedicate short-range communication (DSRC), Global Positioning System (GPS), and infrared networks. In embodiments, the TCU 408 includes a wireless communication module 410 comprising one or more antennas, radios, modems, receivers, and/or transmitters (not shown) for connecting to, or interfacing with, the various wireless networks. In some cases, the TCU 408 can receive external data via the wireless communication module 410 and provide the external data to an appropriate ECU of the VCS 400. In other cases, the TCU 408 can receive internal data from one or more ECUs and/or the data processor 404 with instructions to transmit the internal data to a component of the vehicle system 20, such as, for example, the key fob 36, and/or the mobile application 38 via a remote server (not shown).

As illustrated, the wireless communication module 410 can include a short-range transceiver 412 for wirelessly communicating with the rear wireless unit 66 and/or the wireless unit 64 of the child seat monitoring system 10 using short-range wireless communication technology (e.g., Bluetooth, NFC, RFID, etc.). In some cases, the wireless unit 66 can be included in the wireless communication module 410 such that the TCU 408 directly communicates with the wireless unit 64 of the child seat adapter 60. Data or output signals received by the wireless communication module 410 from the wireless unit 64 can be provided to the data processor 404, via the vehicle data bus 406, for processing by the child seat monitoring module 12.

The TCU 408 can enable the VCS 400, or the vehicle 300, to pair with a user device (e.g., mobile phone, tablet, personal computer, etc.) of the vehicle operator, or more specifically mobile application 38 running on the mobile device, using Bluetooth, WiFi, cellular, or other wireless communication network. In such cases, the VCS 400 can communicate vehicle information to the vehicle operator or other user through the user device and/or the mobile application 38. For example, in embodiments, the VCS 400 may communicate notifications (generated by the child seat monitoring module 12) to the user device for display thereon via the mobile application 38. The notifications displayed using the mobile application 38 may include pictorial messages, such as, e.g., the icons 52, 54, 56, and 58 shown in FIGS. 6A-6D, textual messages, audio messages or sounds, and/or any other type of warning that can be presented to the user through the user device. The TCU 408 can also be used to communicate with a remote server (not shown) associated with a manufacturer of the vehicle 300, the VCS 400, and/or an infotainment system of the vehicle 300, such as the FORD SYNC® system.

The human-machine interface (HMI) 28 (also referred to as a "user interface") can be an ECU for enabling user interaction with the vehicle 300 and for presenting vehicle information to the vehicle operator or driver. The HMI 28 comprises an instrument panel (IP) 414 of the vehicle 300, as well as one or more input devices 416 and/or output devices 418 for inputting, entering, receiving, capturing, displaying, or outputting data associated with the vehicle computing system 400, the child seat monitoring module 12, or the techniques disclosed herein.

In embodiments, the instrument panel 414 (also referred to as a "dashboard" or "cluster") includes a control panel positioned in front of the driver's seat for housing instrumentation and controls for operation of the vehicle 300, including a steering wheel and various gauges (e.g., speedometer, odometer, fuel gauge, etc.), and various vehicle indicators, such as, for example, a selected position of the gearshift 314, seat belt warnings or notifications, low fuel, low tire pressure, etc. In some cases, the instrument panel 414 includes a display 419 (or display screen) for electronically or digitally displaying the various gauges, or values related thereto, and the various vehicle indicators. In other cases, the display 419 is included in the HMI 28 separate from the instrument panel 414 and can be used to display other vehicle information, such as, for example, navigation system information, audio system information, video captured by an external vehicle camera (not shown), image(s) captured by the in-vehicle camera 308, heating and air/conditioning information, etc. In embodiments, the VCS 400 may communicate notifications generated by the child seat monitoring module 12 to the user via the display 419 and/or the instrument panel 414, for example, by displaying the icons 52-58 as one of the vehicle indicators or by displaying the image captured by the in-vehicle camera 308 to alert the vehicle operator to the presence of a child in the child seat 100.

According to embodiments, the input devices 416 can include, for example, one or more of a keyboard, keypad, pointing device (e.g., electronic or optical mouse), touch input device, microphone, voice or speech recognition module, button or push button, slider, switch, knob, dial, and any other type of input device. The output devices 418 can include, for example, one or more of audio speaker(s), other sound-making or audio device(s), display screen(s), light(s), and any other type of output device. The HMI 28 can be configured to interact with the other ECUs of the VCS 400 and/or the data processor 404 via the data bus 406 in order to provide information or inputs received via the HMI 28 to an appropriate component of the VCS 400 and to present, to the vehicle operator, information or outputs received from the various components of the VCS 400.

The body control module (BCM) 26 can be an ECU configured for controlling and monitoring various electronic accessories in a body of the vehicle 300. In embodiments, the BCM 26 includes a power doors control unit 420 for controlling the vehicle doors 50, including locking, unlocking, opening, and/or closing the doors 50. The BCM 26 can also include a power windows control unit 422 for controlling the vehicle windows 48 and/or a power roof unit (e.g., moonroof, sunroof, convertible top, etc.), including opening and closing the windows 48 or the roof unit. In some cases, the power doors control unit 420 and the power windows control unit 422 are included in a separate ECU known as the door control module 424. The BCM 26 can further include an interior lights control unit 426 for controlling the cabin light 44 and any other interior lighting in the cabin area of the vehicle 300. In addition, the BCM 26 can include an exterior lights control unit 428 for controlling the headlights 42a, the taillights 42b, and any other lights on an exterior of the vehicle 300. As shown, the BCM 26 can also include an air conditioning and/or heating control unit 430 for controlling an air-condition unit and a heating unit of the vehicle 300. The BCM 26 may further include control units for controlling other electronically-powered components in the body of the vehicle 300, such as, for example, power mirrors and power seats.

The powertrain control module (PCM) 24 can be an ECU for controlling and monitoring the engine and transmission of the vehicle 300. In some embodiments, the PCM 24 can be separated into two separate ECUs, specifically an engine control unit and a transmission control unit. In either case, the PCM 24 can be configured to control starting and stopping of the engine of the vehicle 300. As shown in FIG. 5, the PCM 24 can include an ignition switch sensor 432 for detecting a position of the ignition switch 312, where the ignition switch can be moved between, for example, an ignition "ON" position, an ignition "OFF" position, a "start" (or crank) position, a "lock" position, and/or an "accessory" (or battery) position. As also shown, the PCM 24 can include a gear position sensor 433 for detecting a position of the gear selector 314 (e.g., P, R, N, D, or L). In some cases, the ignition switch sensor 432 can be included in, or coupled to, the ignition switch 312 and configured to transmit a detected ignition switch position to the PCM 24. Further, the gear position sensor 433 can be included in, or coupled to, the gear selector 314 and configured to transmit a detected gear position to the PCM 24. The PCM 24 can be configured to provide the detected gear position and/or the detected ignition switch position to the data processor 404, via the vehicle data bus 406, for processing by the child seat monitoring module 12.

In some embodiments, the VCS 400 further includes a remote keyless system (RKS) unit 434 for controlling and monitoring remote, keyless interactions between the key fob 36 and the vehicle 300. The RKS unit 434 can include a remote keyless entry system and in some cases, a remote keyless ignition system. In the latter case, the RKS unit 434 may be referred to as a "passive entry passive start" (PEPS) system. In some embodiments, the RKS unit 434 is a separate, stand-alone ECU that is interconnected to the BCM 26, PCM 24, TCU 408, and other ECUs of the VCS 400 via the vehicle bus 406 in order to carry out the RKS/PEPS operations. For example, the RKS unit 434 may receive vehicle commands from the key fob 36 via the TCU 408, process the commands to identify the appropriate ECU for carrying out the command, send the command to the identified ECU, and confirm performance of the command. In other embodiments, the RKS unit 434 may be comprised of multiple segments that are incorporated into various ECUs of the VCS 400, such as, for example, the BCM 26, the PCM 24, and/or the TCU 408, to process the RKS/PEPS commands received at each ECU. In still other embodiments, the RKS unit 434 may be included within one ECU, such as, e.g., the TCU 408, in order to handle or process RKS/PEPS commands as they are received by the wireless communication module 410 of the TCU 408. In embodiments, the VCS 400 may communicate notifications generated by the child seat monitoring module 12 to the user via the key fob 36, for example, by flashing, blinking, or otherwise illuminating one or more lights (e.g., light emitting diodes (LEDs)) included on the key fob 36, or displaying a pictorial textual message on a display screen (not shown) of the key fob 36.

The restraint control module (RCM) 22 can be an ECU for controlling and monitoring a restraint system (not shown) of the vehicle 300, including the rear seat belt system 202 of the rear seat 302, a seat belt system of the driver's seat 304, and a seat belt system of the front passenger's seat 306, and a supplemental restraint system (SRS) (not shown), including one or more vehicle airbags. As shown, the RCM 22 can include a seat belt buckle sensing unit 436 configured to monitor a buckle status of the seat belt buckles in the vehicle 300. In embodiments, the seat belt buckle sensing unit 436 includes, or is communicatively coupled to, the rear seat buckle sensor 34. In some embodiments, the seat belt buckle sensing unit 436 is communicatively coupled to the child seat buckle sensor(s) 14 via the rear seat buckle sensor 34 and/or the child seat adapter 60 shown in FIG. 7. In such cases, the seat belt buckle sensing unit 436 can receive output signals transmitted by the child seat sensors 19 and provide them to the child seat monitoring module 12 via the vehicle data bus 406 for processing in accordance with the techniques described herein.

As shown in FIG. 5, the RCM 22 can further include a seat presence detection unit 438 configured to monitor a presence status for each of the seats 302, 304, and 306 in the vehicle 300. In some embodiments, the seat presence detection unit 438 can be an occupant classification system (OCS) for detecting the presence of, and distinguishing between, vehicle occupants in each of the seats 302, 304, and 306. The seat presence detection unit 438 can include, or be communicatively coupled to, the rear seat presence detector 32. As an example, the rear seat presence detector 32 may transmit an output signal indicative of a measured weight or pressure detected on the rear seat 302. Based on the measured weight, the vehicle OCS can determine an occupant's size and/or whether an adult, child, or car seat is sitting on the rear seat 302. The vehicle OCS can also receive output signals from the rear seat belt system 202 of the vehicle 300, including, for example, whether the seat belt system 202 is buckled and/or a measured tension in the seat belt 203, in order to determine whether a child seat is occupying the rear seat 302 versus a heavy object or an adult. An output of the seat presence detection unit 438 can be provided to the child seat monitoring module 12, via the vehicle data bus 406, for processing in accordance with the techniques described herein.

The data processor 404 can comprise one or more of a microprocessor, a microcontroller, a programmable logic array, an application-specific integrated circuit, a logic device, or other electronic device for processing, inputting, outputting, manipulating, storing, or retrieving data. In embodiments, the VCS 400 can comprise a general purpose computer that is programmed with various programming instructions or modules stored in the data storage device 402 (e.g., electronic memory), or elsewhere.

The data storage device 402 can comprise one or more of electronic memory, nonvolatile random access memory (e.g., RAM), flip-flops, a computer-writable or computer-readable storage medium, a magnetic or optical data storage device, a magnetic or optical disc drive, a hard disk drive, or other electronic device for storing, retrieving, reading, or writing data. The data storage device 304 stores one or more software program modules or software instructions, including the child seat monitoring module 12, for execution by the data processor 404. In some cases, the data storage device 402 also stores pictorial icons, textual messages, or other warnings 440 configured to alert the driver of the vehicle 300 to an alarm condition, including the icons 52-58 shown in FIGS. 6A-6D.

Figure 8:
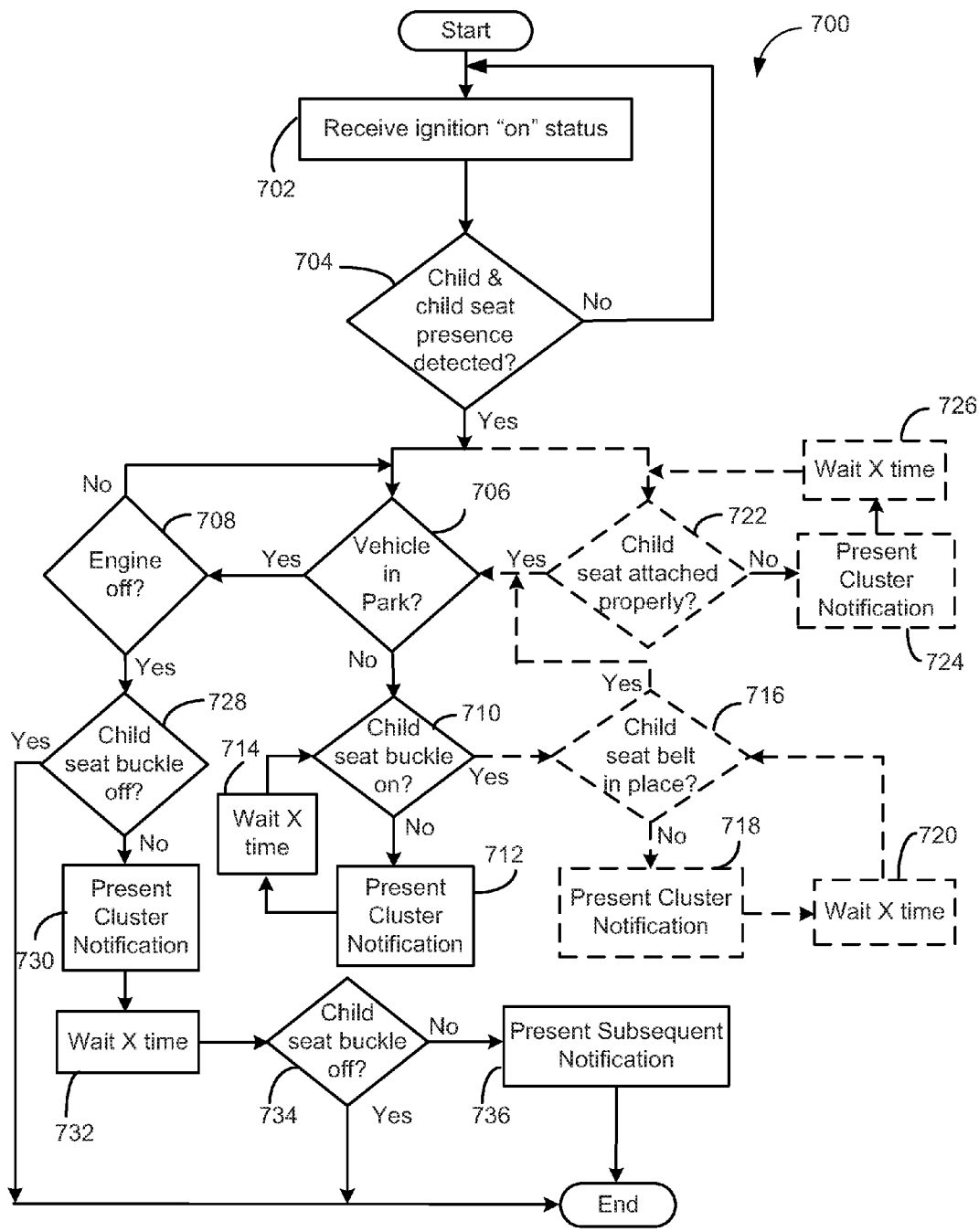
FIG. 8 is a flow diagram of an example method for providing child seat monitoring in a vehicle, in accordance with certain embodiments.

FIG. 8 illustrates an example method 700 for providing child seat monitoring in a vehicle (such as, e.g., the vehicle 300 shown in FIG. 4), in accordance with embodiments. The method 700 can be carried out by one or more processors (or controllers) included in, for example, a child seat monitoring system (such as, e.g., the child seat monitoring system 10 shown in FIG. 1), a vehicle system (such as, e.g., the vehicle system 20 shown in FIG. 1), and/or a vehicle computing system itself (such as, e.g., the vehicle computing system 400 shown in FIG. 5). In one embodiment, the method 700 is implemented, at least in part, by the data processor 404 of the VCS 400 executing software stored in the data storage device 402, such as, e.g., the child seat monitoring module 12, and interacting with one or more components of the VCS 400 and/or the child seat monitoring system 10 coupled thereto.

The method 700 can begin at step 702 where the processor and/or the child seat monitoring module receives an input signal from a powertrain control module (such as, e.g., the PCM 24) of the vehicle and/or an ignition switch sensor (such as, e.g., the ignition switch sensor 432 shown in FIG. 7), the input signal indicating that ignition is on (e.g., the ignition switch is turned to the "on" position). In response to receipt of the ignition "on" status of the vehicle, the method 700 continues to step 704 to determine whether the presence of a child seat (such as, e.g., the child seat 100 or the child seat 200) has been detected in a rear seat of the vehicle (e.g., the rear seat 302 shown in FIG. 4) and if so, whether the presence of a child has been detected in the child seat. The determination at step 704 can be made based on input signals received from a rear seat presence detector in the rear seat of the vehicle (such as, e.g., the rear seat presence detector 32 shown in FIG. 1) and a child presence detector in the child seat (such as, e.g., the child presence detector 17). Both of these input signals may be received via a restraint control module of the vehicle (such as, e.g., the RCM 22 shown in FIG. 5) that is coupled to, or includes, the presence-detecting devices connected to the rear seat and the child seat. If a child and a child seat are not detected at step 704, the method 700 can loop back to the beginning and keep checking for the child and child seat presence as long as the ignition status is "on."

From step 704, the method 700 can continue to step 706 to determine whether the vehicle gearshift (e.g., the gearshift 314 shown in FIG. 4) is in a "park" position or a non-park position (e.g., drive, reverse, neutral, low gear, etc.). The determination at step 706 can be made based on an input signal received from the gearshift of the vehicle, a gear position sensor (e.g., the gear position sensor 433 shown in FIG. 5), and/or the powertrain control module, the input signal indicating the selected gear. If the vehicle is in park, the method 700 continues to step 708 to determine whether an engine of the vehicle is has been turned off, for example, based on a current position of the ignition switch. That is, at step 708, the method 700 determines whether the vehicle ignition switch is in the "off" position (e.g., the vehicle has been parked and is turned off) or in the "on" position (e.g., the vehicle has been parked and is still on). If the engine is still on (e.g., a determination of "no" at step 708), the method 700 loops back to step 706 to determine whether the vehicle gearshift position is still in "park." The method 700 may continue to loop between steps 706 and 708 as long as the vehicle gear is in park and the ignition switch is on (e.g., while the engine is running idle).

If, at step 706, the gearshift position is in a non-park position, for example, because the gearshift has been moved to the "reverse" or "drive" position (e.g., the determination at step 706 is "no"), the method 700 continues to step 710 to determine whether a seat belt buckle of the child seat is on or fastened. The determination at step 710 can be made based on an input signal received from the RCM and/or the child seat monitoring system. For example, if the child seat is using the rear seat belt of the vehicle to secure the child into the child seat (such as, e.g., the child seat 200 shown in FIG. 3), the RCM can receive buckle status information from a rear seat buckle sensor included in a rear seat belt system of the vehicle (such as, e.g., the rear seat buckle sensor 34) and provide the received buckle status information to the processor and/or the child seat monitoring module. As another example, if the child seat has an independent restraint system (such as, e.g., the restraint system 103 of the child seat 100 shown in FIG. 2), an adapter coupled to the child seat (e.g., the child seat adapter 60 shown in FIG. 7) can receive child seat buckle status information from a child seat buckle sensor included in the child seat (such as, e.g., the child seat buckler sensor 14 shown in FIG. 1) and provide the received buckle status information to the processor and/or the child seat monitoring module.

If the buckle status information indicates that the child seat is not properly buckled or fastened, a driving alarm condition is detected, and the method 700 continues to the step 712 to present an alert or other notification (e.g., from the first set of notifications) through an instrument panel (e.g., cluster or dashboard) or display screen of the vehicle (such as, e.g., the HMI 28 shown in FIG. 5). In some cases, the notification may be a visual or pictorial warning that is displayed on a display of the vehicle dashboard (e.g., the display 419 shown in FIG. 5). For example, the notification icons 52 or 56 may be displayed in a flashing state or with a circle around it and a diagonal line across the icon in order to indicate that a proper buckle status has not been detected. As will be appreciated, the icon 52 may be displayed when the child seat 100 is detected in the rear seat, and the icon 56 may be used when the child seat 200 is detected in the rear seat. In other cases, the notification may be an audible alert, such as, e.g., a chime, alarm, or audio message, that is transmitting through an audio speaker or other audio device of the vehicle dashboard. In still other cases, a combination of the visual warning and the audible warning may be presented to the vehicle operator on the vehicle dashboard.

After the initial warning presentation is complete, the method 700 continues to step 714 to wait for a predetermined amount of time (X) (e.g., ten to twenty seconds) (e.g., using a timer of the vehicle computing system) before repeating the determination at step 710. This provides the driver with an opportunity to buckle the child seat belt before the child monitoring module and/or the processor re-checks the child seat buckle status. The method 700 may continue to loop through steps 710, 712, and 714 until the child seat buckle is properly buckled, or until the vehicle is turned off.

In some embodiments, if the determination at step 710 is "yes" (e.g., the child seat buckle is on), the method 700 continues back to step 706 to re-check the gear status of the vehicle. So long as the vehicle is in a gear other than park (e.g., a non-parking position), the method 700 continues to monitor the buckle status of the child seat in accordance with step 710. As a result, the child seat monitoring module can help ensure that the child seat is properly buckled whenever the vehicle is moving or not parked (e.g., during a driving event).

In other embodiments, if the determination at step 710 is "yes" (e.g., the child seat buckle is on), the method 700 continues to step 716 to determine whether the child seat belt is properly positioned over the child in the child seat. The determination at step 716 can be made based on an input signal received from the RCM and/or a child seat belt sensor in the child seat (e.g., the child seat belt sensor 16 shown in FIG. 2), the input signal indicating a belt position status of the child seat belt. In the case of a child seat that uses the rear seat belt system (e.g., the child seat 200 shown in FIG. 3), the RCM may receive seat belt position information from the rear seat belt system and may provide the received information to the processor and/or the child seat monitoring module. In the case of a child seat that includes its own restraint system (e.g., the child seat 100 shown in FIG. 2), the RCM may receive the child seat belt position information from a child seat adapter coupled to either the rear seat buckle sensor of the vehicle or the RCM itself. If the determination at step 716 is "yes" (e.g., the belt status is proper), the method 700 continues back to step 706 to determine whether the gearshift of the vehicle is in the "park" position or in a non-park position.

If, on the other hand, the determination at step 716 is "no" (e.g., the belt status is not proper), a driving alarm condition is detected, and the method 700 continues to step 718 to present an alert or other notification (e.g., form the first set of notifications) through the instrument panel or display screen of the vehicle. In some cases, the notification may be a visual or pictorial warning that is displayed on a display of the vehicle dashboard. For example, the notification icon 54 may be displayed if the lap belt is too low or around the legs of the child, and the notification icon 58 may be displayed if the lap belt is too high or on the abdomen of the child. Other icons or graphical warnings may be displayed specific to the belt position detected by the child seat belt sensor and may include, for example, an icon specific to the child seat 100. In other cases, the notification may be an audible alert, such as, e.g., a chime, alarm, or audio message, that is transmitting through an audio speaker or other audio device of the vehicle dashboard. In still other cases, a combination of the visual warning and the audible warning may be presented to the vehicle operator on the vehicle dashboard.

After the warning presentation is complete, the method 700 continues to step 720 to wait for a predetermined amount of time (X) (e.g., ten to twenty seconds) before repeating the determination at step 716. This provides the driver with an opportunity to correct the child seat belt position before the child monitoring module and/or the processor re-checks the child seat belt status. The method 700 may continue to loop through steps 716, 718, and 720 until the child seat belt is properly positioned, or until the vehicle is turned off.

In some embodiments, the method 700 further includes step 722 to determine whether the child seat is properly attached to the vehicle. Step 722 can occur substantially simultaneously with step 706, or at a different, adjacent point in time (e.g., sequentially before or after). The determination at step 722 can be made based on an input signal received from the RCM and/or a child seat attachment sensor in the child seat (e.g., the child seat attachment sensor 18 shown in FIG. 2), the input signal indicating an attachment status of the child seat. The RCM may receive the attachment status information from the child seat adapter coupled to the rear seat belt sensor of the vehicle or the RCM itself. If the determination at step 722 is "yes" (e.g., the child seat is attached properly), the method 700 continues back to step 706 to determine whether the gearshift of the vehicle is in the "park" position or in a non-park position.

If, on the other hand, the determination at step 722 is "no" (e.g., the car seat is not properly attached), a driving alarm condition is detected, and the method 700 continues to step 724 to present an alert or notification (e.g., from the first set of notifications) through the instrument panel or display screen of the vehicle. In some cases, the notification may be a visual or pictorial warning that is displayed on a display of the vehicle dashboard and graphically indicates the attachment status of the child seat (e.g., an icon showing the areas of the child seat tether system that are not attached). In other cases, the notification may be an audible alert, such as, e.g., a chime, alarm, or audio message, that is transmitting through an audio speaker or other audio device of the vehicle dashboard. In still other cases, a combination of the visual warning and the audible warning may be presented to the vehicle operator on the vehicle dashboard.

After the warning presentation is complete, the method 700 continues to step 726 to wait for a predetermined amount of time (X) (e.g., ten to twenty seconds) before repeating the determination at step 722. This provides the driver with an opportunity to correct the child seat attachment configuration, or fasten the child seat tethers, before the child monitoring module and/or the processor re-checks the child seat attachment status. The method 700 may continue to loop through steps 722, 724, and 726 until the child seat tethers are properly attached, or until the vehicle is turned off.

Referring back to step 708, if the determination is "yes" (e.g., the engine is turned off or the ignition switch is in the "off" position), the method 700 continues to step 728 to determine whether the child seat belt buckle is off or unbuckled. The determination at step 728 can be made based on an input signal received from the RCM and/or the child seat buckle sensor, the input signal indicating the buckle status of the child seat belt. In the case of a child seat that uses the rear seat belt, the RCM may receive buckle status information from the rear seat buckle sensor and may provide the received information to the processor and/or the child seat monitoring module. In the case of a child seat that includes its own restraint system, the RCM may receive the child seat buckle status information from the child seat adapter coupled to either the rear seat buckle sensor of the vehicle or the RCM itself. If the determination at step 728 is "yes" (e.g., the child seat belt is unbuckled), the method 700 may end.

If, on the other hand, the determination at step 728 is "no" (e.g., the child seat belt is buckled), a non-driving alarm condition is detected, and the method 700 continues to step 730 to present a first alert or notification (e.g., the initial notification from the second set of notifications) on the instrument panel or display screen of the vehicle. In some cases, the first notification may be a visual or pictorial warning that is displayed on a display of the vehicle dashboard. For example, the notification icon 52 may be displayed if the child seat 100 is detected in the vehicle, and the notification icon 56 may be displayed if the child seat 200 is detected in the vehicle. Other icons or graphical messages may also be displayed, including, for example, a "warning" label or a textual reminder to unbuckle the child seat. In other cases, the notification may be an audible alert, such as, e.g., a chime, alarm, or audio message, that is transmitting through an audio speaker or other audio device of the vehicle dashboard. In still other cases, a combination of the visual warning and the audible warning may be presented to the vehicle operator on the vehicle dashboard.

After the warning presentation is complete, the method 700 continues to step 732 to wait for a predetermined amount of time (X) (e.g., ten to twenty seconds). This provides the driver with an opportunity to correct unbuckle the child seat buckle before the child monitoring module and/or the processor re-checks the child seat buckle status. After the wait time is over, the method 700 continues to step 734 to determine whether the child seat buckle has been unbuckled. If the determination at step 734 is "yes" (e.g., the child seat buckle is off), the method 700 may end. If the determination at step 734 is "no" (e.g., the child seat buckle is still on), the method 700 continues to step 736 to present a second, more obtrusive alert or notification using an exterior and/or interior portion of the vehicle (e.g., a subsequent notification from the second set of notifications). The second or subsequent notification(s) can continue to be presented until the non-driving alarm condition is removed, at which point the method 700 may end.

In embodiments, the subsequent notification(s) can include one or more of (i) a light-based alert (e.g., turning on interior lights (e.g., the cabin lights 44 shown in FIG. 4) if an external environment of the vehicle is dark or has low-lighting, turning on or flashing vehicle lights (e.g., headlights 42*a* and/or taillights 42*b*), or blinking key fob light(s) (e.g., on the key fob 36 shown in FIG. 1)); (ii) an audible alarm (e.g., sounding a vehicle horn (e.g., the horn 40 shown in FIG. 4) or activating an alarm system (e.g., the alarm system 30)); (iii) a graphical warning (e.g., displaying one of the icons 52 or 56 on a mobile device of the vehicle operator (e.g., using the mobile application 38 shown in FIG. 1)); and (iv) an automatic system override (e.g., turning on a vehicle A/C and heating system (e.g., the A/C and heating system 46 shown in FIG. 1), opening vehicle windows (e.g., the windows 48 shown in FIG. 4), and/or unlocking vehicle doors (e.g., the vehicle doors 50 shown in FIG. 4).

In some embodiments, the child seat monitoring system 10 can be manually turned on or off by the vehicle operator. For example, the vehicle operator may activate the child seat monitoring system 10 after placing a child in the child seat 100 and starting the engine of the vehicle 300. In such cases, the method 700 may begin at step 706 and may not include steps 702 and 704. In other embodiments, the child seat monitoring module 10 can be automatically activated by the data processor 404 each time the vehicle engine is turned on. In such cases, the method 700 may begin at step 702 as shown in FIG. 8.

In certain embodiments, the process descriptions or blocks in the figures, such as FIG. 8, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. A vehicle, comprising:
 a seat belt sensor for detecting a child seat belt status;
 a vehicle gear selector;
 a child presence detector;
 a user interface to present a first notification when the gear selector is in park, the seat belt sensor detects that the child seat belt status is buckled, and the child presence detector detects a child in the vehicle;
 vehicle windows; and
 a vehicle window system to open the vehicle windows a predetermined amount when the gear selector is in park, the seat belt sensor detects that the child seat belt status is buckled, and the child presence detector detects a child in the vehicle.

2. The vehicle of claim 1, wherein the user interface is to present a second notification when the child seat belt status indicates an unbuckled seat belt and the selected gear is one of drive, reverse, neutral, or low gear.

3. The vehicle of claim 1, wherein the user interface is to present a third notification when the child seat belt status indicates a buckled seat belt that is improperly positioned relative to a child.

4. The vehicle of claim 1, wherein the user interface includes a display and the first notification is a graphical warning.

5. The vehicle of claim 1, wherein the user interface includes an audio device and the first notification is an audible alarm.

6. The vehicle of claim 1, further comprising a child seat attachment sensor coupled to a child seat for detecting a child seat attachment status, wherein the user interface is to present a fourth notification based on the child seat attachment status and a selected gear of the vehicle gear selector.

7. The vehicle of claim 6, wherein the user interface presents the fourth notification if the child seat attachment status is negative.

8. The vehicle of claim 6, further comprising a child seat adapter configured to communicatively couple at least one of the seat belt sensor and the child seat attachment sensor to a processor.

9. The vehicle of claim 8, wherein the child seat adapter is configured to wirelessly communicate at least one of the child seat belt status and the child seat attachment status to the processor.

10. The vehicle of claim 1, further comprising an ignition switch selectively movable between an on position and an off position, wherein the user interface is to present a fifth notification based on the child seat belt status and a selected ignition position.

11. The vehicle of claim 10, wherein the user interface presents the fifth notification when the child seat belt status indicates a unbuckled seat belt and the selected ignition position is in the on position.

12. The vehicle of claim 10, wherein the vehicle window system is to open the vehicle windows a predetermined amount in response to determining that the selected ignition position is in the off position and the seat belt sensor detects that the child seat belt status is buckled for a predetermined time period.

13. The vehicle of claim 10, further comprising a vehicle horn system to sound a vehicle horn in response to the selected ignition position being in the off position and the child seat belt status being buckled for a predetermined period of time.

14. The vehicle of claim 1, wherein the user interface is rendered by a mobile device communicatively coupled with the vehicle.

15. The vehicle of claim 1, further comprising vehicle doors disabling locking in response to the gear selector being in park, the child seat belt status being buckled, and the child presence detector detecting a child in the vehicle for a predetermined period of time.

16. A method for providing child seat monitoring in a vehicle, comprising:
responsive to a vehicle gear selector being in a park position, a seat belt sensor detecting that a child seat belt status is buckled, and a child presence status determined by a child presence detector indicating a child in the vehicle:
presenting, via a user interface, a first notification when the gear position is in the park position, the child presence status is positive, and the child seat belt status is buckled; and
opening, via a vehicle window system, vehicle windows a predetermined amount.

17. The method of claim 16, further comprising continuing to present the first notification if the gear position, the child presence status, and the child seat belt status do not change within a predetermined time period.

18. The method of claim 16, further comprising presenting a second notification using one or more vehicle systems if the gear position, the child presence status, and the child seat belt status do not change within a predetermined time period.

19. The method of claim 18, wherein the one or more vehicle systems include at least one of the vehicle doors, the vehicle windows, and a vehicle horn.

20. The method of claim 16, wherein the user interface is rendered by a mobile device communicatively coupled with the vehicle.

21. A method of providing child seat monitoring in a vehicle, comprising:
responsive to a vehicle gear selector being in a park position, a seat belt sensor detecting that a child seat belt status is buckled, and a child presence status determined by a child presence detector indicating a child in the vehicle:
presenting, via a vehicle user interface, a first notification when a gear position is the park position and the child seat belt status is buckled; and
opening, via a vehicle window system, vehicle windows a predetermined amount;
disabling locking of vehicle doors in response to the first notification continuing for a predetermined period of time.

22. The method of claim 21, further comprising continuing to present the first notification if the gear position and the child seat belt status do not change within the predetermined time period.

23. The method of claim 21, further comprising:
receiving a child seat attachment status from a child seat attachment sensor; and
presenting a second notification, via the user interface, when the child seat attachment status is negative and the gear position is a non-park position.

24. The method of claim 23, wherein the non-park position includes one of a drive position, a reverse position, a neutral position, and a low-gear position.

25. The method of claim 21, further comprising:
receiving an ignition switch position from a vehicle ignition switch sensor; and
presenting a third notification, via the vehicle user interface, when the ignition switch position is an off position and the child seat belt status is buckled.

26. The method of claim 25, further comprising presenting a fourth notification using one or more vehicle systems if the child seat belt status and the ignition switch position do not change within a predetermined time period.

27. The method of claim 26, wherein the one or more vehicle systems include at least one of the vehicle doors, the vehicle windows, and a vehicle horn.

28. A vehicle, comprising:
a seat belt sensor for detecting a child seat belt status;
a vehicle gear selector;
an ignition switch selectively movable between an on position and an off position;
a user interface to present (1) a first notification in response to the gear selector being in park and the seat belt sensor detecting the child seat belt status is buckled and (2) a second notification in response to the ignition switch being in the on position and the seat belt sensor detecting the child seat belt status is unbuckled;
vehicle doors disabling locking in response to the gear selector being in park and the child seat belt status being buckled for a predetermined time period; and,
opening, via a vehicle window system, vehicle windows a predetermined amount.

29. A vehicle, comprising:
a seat belt sensor for detecting a child seat belt status;
a vehicle gear selector;
an ignition switch selectively movable between an on position and an off position;
a user interface to present a notification when the gear selector is in park and the seat belt sensor detects the child seat belt status is buckled;
a vehicle horn system to sound a vehicle horn in response to the ignition switch being in the off position and the child seat belt status being buckled for a predetermined time period;
vehicle windows; and
a vehicle window system to open the vehicle windows a predetermined amount in response to the ignition switch being in the off position and the child seat belt status being buckled for a predetermined time period.

* * * * *